(12) United States Patent
Ivanovic et al.

(10) Patent No.: US 12,158,037 B2
(45) Date of Patent: Dec. 3, 2024

(54) MONITORING SYSTEM FOR A DOOR OF A DOMESTIC APPLIANCE AND DOMESTIC APPLIANCE COMPRISING SUCH A SYSTEM

(71) Applicant: ELECTROLUX APPLIANCES AKTIEBOLAG, Stockholm (SE)

(72) Inventors: Branko Ivanovic, Rothenburg ob der Tauber (DE); Dietmar Hildner, Fürth (DE)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 684 days.

(21) Appl. No.: 17/281,048

(22) PCT Filed: Sep. 10, 2019

(86) PCT No.: PCT/EP2019/074082
§ 371 (c)(1),
(2) Date: Mar. 29, 2021

(87) PCT Pub. No.: WO2020/069824
PCT Pub. Date: Apr. 9, 2020

(65) Prior Publication Data
US 2021/0348435 A1    Nov. 11, 2021

(30) Foreign Application Priority Data
Oct. 1, 2018  (EP) .................... 18198037

(51) Int. Cl.
*E05F 15/70*   (2015.01)
*F24C 7/08*    (2006.01)
(Continued)

(52) U.S. Cl.
CPC ............ *E05F 15/70* (2015.01); *F24C 7/08* (2013.01); *G01C 19/00* (2013.01); *G01P 15/18* (2013.01);
(Continued)

(58) Field of Classification Search
CPC .. E05F 15/70; F24C 7/08; F24C 15/02; G01C 9/00; G01P 15/18; E05Y 2400/44;
(Continued)

(56) References Cited

U.S. PATENT DOCUMENTS 9,888,828 B2    2/2018  Lagness et al.
11,344,176 B2 *  5/2022  Hodapp, Jr. ........ A47L 15/4259
(Continued)

FOREIGN PATENT DOCUMENTS

DE    3513640      * 10/1986
DE    3513640 A1   * 10/1986
(Continued)

OTHER PUBLICATIONS

EP2636355 English translation (Year: 2013).*
(Continued)

*Primary Examiner* — Janet M Wilkens
(74) *Attorney, Agent, or Firm* — Pearne & Gordon LLP (57) ABSTRACT

The present disclosure relates to a monitoring system for a door (12) of a domestic appliance (10). The monitoring system comprises at least one door sensor (22; 24, 26, 28; 30, 32) arrangeable or arranged at or within the door (12). The door sensor (22; 24, 26, 28; 30, 32) is an inertial measurement unit (IMU) including at least one accelerometer and/or at least one gyroscope. The accelerometer can be provided for detecting a linear acceleration of the door sensor (22; 24, 26, 28; 30, 32). The gyroscope can be provided for detecting a rotational speed of the door sensor (22; 24, 26, 28; 30, 32). The monitoring system determines at least one of the angle (α,α'), the angular speed and the angular acceleration of the door (12).

17 Claims, 8 Drawing Sheets

(51) Int. Cl.
*G01C 19/00* (2013.01)
*G01P 15/18* (2013.01)
*F24C 15/02* (2006.01)
*F25D 23/02* (2006.01)

(52) U.S. Cl.
CPC ........... *E05Y 2400/44* (2013.01); *F24C 15/02* (2013.01); *F25D 23/02* (2013.01); *F25D 2700/02* (2013.01)

(58) Field of Classification Search
CPC .. F25D 23/02; F25D 2700/02; A47L 15/0055; A47L 15/4257; A47L 15/4259; A47L 2401/023; A47L 2401/26; A47L 2501/07; A47L 2501/22; A47L 2501/26
USPC .................. 312/326–329, 228, 236, 237
See application file for complete search history.

(56) References Cited

U.S. PATENT DOCUMENTS

| | | | | |
|---|---|---|---|---|
| 11,439,228 | B2 * | 9/2022 | Gao ..................... | G05B 15/02 |
| 11,702,880 | B2 * | 7/2023 | Carter ................... | E05F 15/73 |
| | | | | 49/31 |
| 2004/0259651 | A1 | 12/2004 | Storek | |
| 2010/0225211 | A1 * | 9/2010 | Kara ................... | A47L 15/4261 |
| | | | | 312/228 |
| 2015/0097691 | A1 * | 4/2015 | Smith ..................... | G08B 3/10 |
| | | | | 340/686.2 |
| 2015/0320289 | A1 * | 11/2015 | Stutts .................... | A47L 15/488 |
| | | | | 134/184 |
| 2017/0198496 | A1 * | 7/2017 | Beck ...................... | E05B 17/22 |
| 2017/0243458 | A1 * | 8/2017 | Langford ................ | G08B 21/02 |
| 2018/0132695 | A1 * | 5/2018 | Lagness ................ | A47L 15/4257 |
| 2018/0172722 | A1 * | 6/2018 | He ......................... | G01P 13/00 |
| 2018/0340768 | A1 * | 11/2018 | Zancanato ............ | G06F 1/1677 |
| 2021/0095513 | A1 * | 4/2021 | Ivanovic ................ | E05F 15/611 |
| 2021/0274993 | A1 * | 9/2021 | Kopera ................ | A47L 15/4259 |
| 2022/0167825 | A1 * | 6/2022 | Mersch ................. | H02J 50/005 |

FOREIGN PATENT DOCUMENTS

| | | | | |
|---|---|---|---|---|
| DE | 102009026670 | A1 * | 12/2010 | ............ A21B 3/02 |
| DE | 102010037397 | | * 3/2012 | |
| EP | 2540208 | | 1/2013 | |
| EP | 2584271 | | * 4/2013 | |
| EP | 2636355 | | * 9/2013 | |
| EP | 3130696 | | 2/2017 | |
| JP | 2016011798 | | 1/2016 | |
| WO | WO-2018142136 | A1 * | 8/2018 | ............ F25D 23/12 |
| WO | 2019015960 | | * 1/2019 | |

OTHER PUBLICATIONS

EP2584271 English translation (Year: 2013).*
WO2019015960 English translation (Year: 2019).*
DE102010037397 English translation (Year: 2012).*
English translation WO20190159960 (Year: 2019).*
Translation DE102009026670 (Year: 2010).*
SparkFun Triple Axis Accelerometer and Gyro Breakout—MPU-6050 ;http;//www.sparkfun.com/products/retired/11028 (Year: 2011).*
International Search Report and Written Opinion for PCT/EP2019/074082, dated Nov. 4, 2019, 9 pages.

* cited by examiner

MONITORING SYSTEM FOR A DOOR OF A DOMESTIC APPLIANCE AND DOMESTIC APPLIANCE COMPRISING SUCH A SYSTEM

The present invention relates to a monitoring system for a door of a domestic appliance. Further, the present invention relates to a domestic appliance.

For a door or another openable and closable access device of a domestic appliance a detection system may be provided for detecting if said door or device is in an opened, closed state or intermediate state between said opened and closed state. For an automatic door it is very important to control the opening and closing speed and the current opening angle of said door. But also for a manual door it may be important to support the movement of said door.

Conventional systems for detecting the opening angle of the door comprise sensors arranged at the door hinge or close to said door hinge. In this case it is difficult to detect exactly the opening angle of the door. Other system comprises sensors arranged in positions, where the temperature is very high. Said high temperature impairs the accuracy of the sensor.

It is an object of the present invention to provide a monitoring system for a door of a domestic appliance, which allows the detection of the state of the door with improved accuracy by low complexity.

According to the present invention a monitoring system for a door of a domestic appliance is provided, wherein:
- the monitoring system comprises at least one door sensor arrangeable or arranged at or within the door,
- the door sensor is an inertial measurement unit (IMU) including at least one accelerometer and/or at least one gyroscope,
- the accelerometer can be provided for detecting a linear acceleration of the door sensor,
- the gyroscope can be provided for detecting a rotational speed of the door sensor, and
- the monitoring system determines at least one of the angle, the angular speed and the angular acceleration of the door.

The core of the present invention is the use of the inertial measurement unit (IMU) with the at least one accelerometer and/or at least one gyroscope. The inertial measurement unit (IMU) is a compact device arrangeable in numerous suitable positions. A combination of the accelerometer and gyroscope allows the determination of the angle, the angular speed and the angular acceleration of the door by low complexity.

Preferably, the door sensor is arrangeable or arranged at a maximum distance from a hinge axis of the door. Said maximum distance contributes to an improved measuring accuracy.

For example, the door sensor is arrangeable or arranged within an upper portion of the door, preferably within an upper third of said door.

Further, the door sensor may be arrangeable or arranged within an inner portion of the door, preferably within an upper third of the inner portion of said door.

In particular, the door sensor is arrangeable or arranged in a low temperature area of the door.

For example, the door sensor is arrangeable or arranged within a door handle of the door.

Alternatively, the door sensor may be arrangeable or arranged within a front panel of the door.

Further, the accelerometer may include one or more microelectromechanical systems (MEMS).

Preferably, the accelerometer is a tri-axial accelerometer, wherein the three axes are orthogonal to each other.

Moreover, the gyroscope may include one or more microelectromechanical systems (MEMS).

In particular, the gyroscope is a tri-axial gyroscope, wherein the three axes are orthogonal to each other.

Furthermore, the monitoring system may be provided for indicating the angle, the angular speed and/or the angular acceleration of the door, wherein said door is manually and/or automatically openable and closable.

Additionally, the monitoring system may be provided for controlling the angle, the angular speed and/or the angular acceleration of the door, wherein said door is automatically openable and closable by at least one motor.

For example, the monitoring system is provided for varying or keeping constant the angular speed of the door during the automatic opening and/or closing said door.

Further, the monitoring system may be provided for a drop down door.

Moreover, the monitoring system may be provided for a swing door.

At last, the present invention relates to a domestic appliance comprising at least one door, wherein said domestic appliance comprises at least one monitoring system mentioned above.

Novel and inventive features of the present invention are set forth in the appended claims.

BRIEF DESCRIPTION OF THE DRAWINGS

The present invention will be described in further detail with reference to the drawings, in which.

DETAILED DESCRIPTION OF THE DRAWINGS

Figure 1:
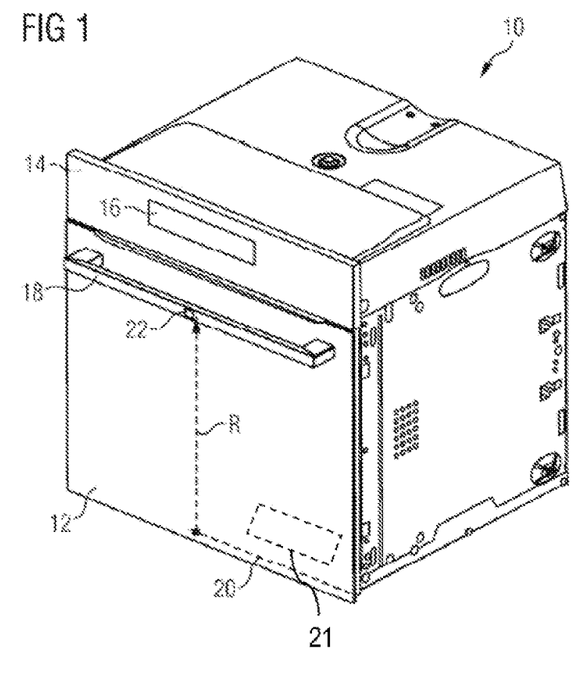
FIG. 1 illustrates a schematic perspective view of a domestic appliance with a monitoring system according to a first embodiment of the present invention.

FIG. 1 illustrates a schematic perspective view of a domestic appliance 10 with a monitoring system according to a first embodiment of the present invention. In this example, the domestic appliance 10 is a cooking oven. In general, the domestic appliance 10 may be an arbitrary domestic appliance.

The domestic appliance 10 comprises a door 12 and a front panel 14. A user interface 16 is integrated within said front panel 14. A door handle 18 is attached at the door 12. In this embodiment the door 12 is a drop down door. A horizontal hinge axis 20 extends in the lower portion of the door 12, while the door handle 18 is attached in the upper portion of said door 12. The terms "lower" and "upper" relate to the closed state of the door 12.

The monitoring system comprises a door sensor 22 arranged within the door handle 18. Thus, the door sensor 22 is arranged in low temperature area of the door 12. The low temperature area avoids measurement errors of the door sensor 22. The distance R between the door sensor 22 and the horizontal hinge axis 20 is maximised as possible. The big distance R between the door sensor 22 and the horizontal hinge axis 20 allows a high precision of said door sensor 22.

Preferably, the door sensor 22 is an inertial sensor. In this example, the door sensor 22 is an inertial measurement unit (IMU), wherein said inertial measurement unit includes at least one accelerometer and at least one gyroscope. The accelerometer is provided for detecting a linear acceleration of the door sensor 22. The gyroscope is provided for detecting a rotational speed co of the door sensor 22 relating to an axis. Preferably, the unit of said rotational speed co is degrees per second.

In particular, the accelerometer as well as the gyroscope includes one or more microelectromechanical systems (MEMS). Said microelectromechanical systems are suitable for inertial measurements. The microelectromechanical systems are realised by low costs, have small sizes and cause only low power consumption.

Preferably, the accelerometer is a tri-axial accelerometer, while the gyroscope is a tri-axial gyroscope, wherein the three axes are orthogonal to each other. The accelerometer and the gyroscope have to be calibrated according to their applications.

Since the movement of the door 12 has usually one degree of freedom, a simpler model of said movement of the door 12 may be derived. The distance R between the door sensor 22 and the horizontal hinge axis 20 is constant, while the movement of the door 12 is circular. The distance R corresponds with the radius R of the orbit of the door sensor 22. Said radius R is defined as the horizontal length of the inertial measurement unit. The angle α of the door 12 starts from the closed state of said door 12. The door sensor 22 effectively detects the angle α, the angular speed and the angular acceleration of the door 12.

The acceleration of the door 12 may be directly provided by the door sensor 22, if the accelerometer is equipped with a micro controller. If said accelerometer is not equipped with the micro controller, then an output signal value is provided for a control unit. On the basis of input data, i.e. directly detected acceleration values or output signal values, the control unit compares duty cycle data with firmware set up data and sends an output signal to a motor 21 in order to adjust the opening speed of the door 12. The opening speed of the door 12 may be speeded up, kept constant or slowed down.

Further, the door sensor 22 is connected to a control unit of the domestic appliance 10. Said control unit is not explicitly shown. Preferably, the door sensor 22 is connected to the control unit via cables. The control unit is suitable for an automatic door 12 as well as for a manual door 12. In the case of the automatic door 12, the control unit is connected to at least one motor 21 for driving said door 12. The control unit activates and deactivates the motor 21 and controls the speed and the acceleration of said motor 21. In the case of the manual door 12, the control unit is connected to an output device for indicating the current state of said door 12.

The information of the current state of said door 12 may be used for controlling a cooking process. For example, some heating operation are activated only, if the door 12 is actually closed. Moreover, the control unit may output a warning signal, if the door 12 is not correctly closed. Further, the control unit may output a signal indicating that a lighting device in the domestic appliance 10 has to be switched on or off.

Thus, the door sensor 22 mentioned above may replace a classical mechanical door switch with a plunger detecting the opening and closing state of the door 12. Since the mechanical door switch with the horizontal plunger has a tolerance depending on its assembly position, a wrong signal may be delivered. This is avoided by the door sensors and the related control unit according to the present invention.

Figure 2:
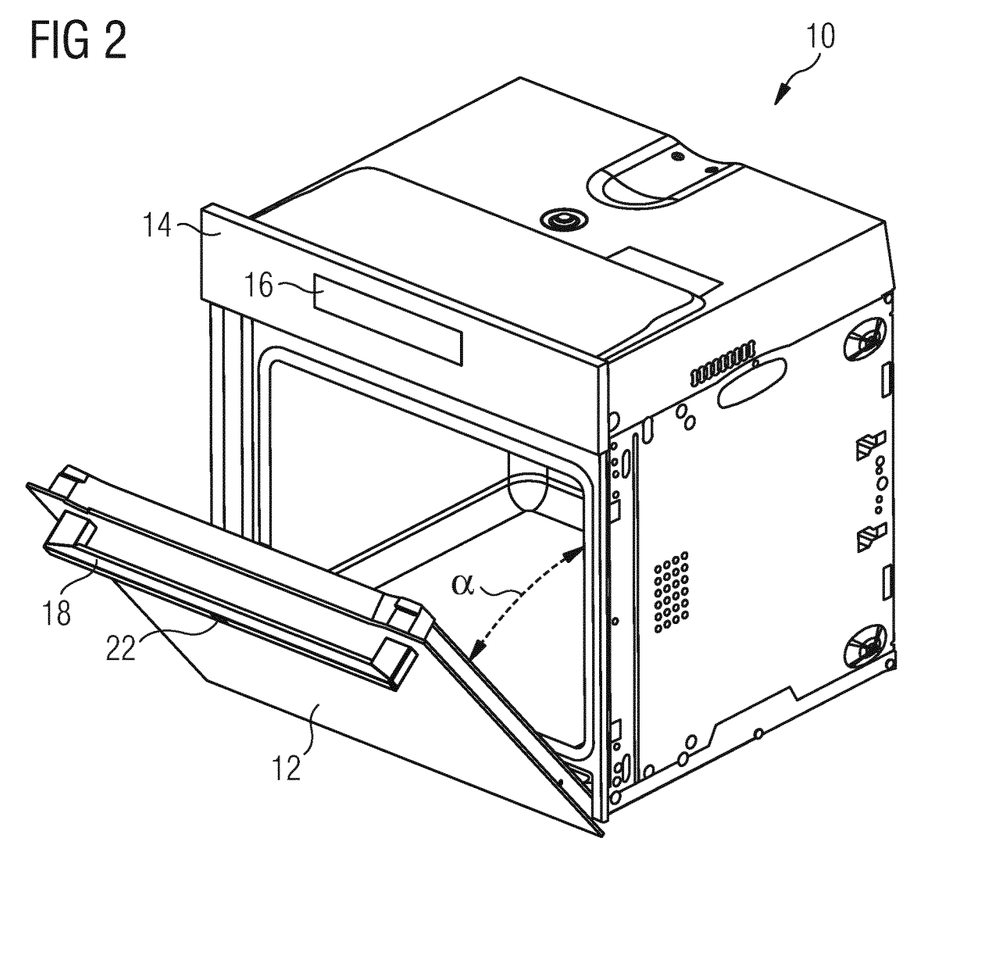
FIG. 2 illustrates a schematic perspective view of the domestic appliance with the monitoring system according to the first embodiment of the present invention.

FIG. 2 illustrates a schematic perspective view of the domestic appliance 10 with the monitoring system according to the first embodiment of the present invention. In FIG. 2 the door 12 is partially opened to an angle α.

Figure 3:
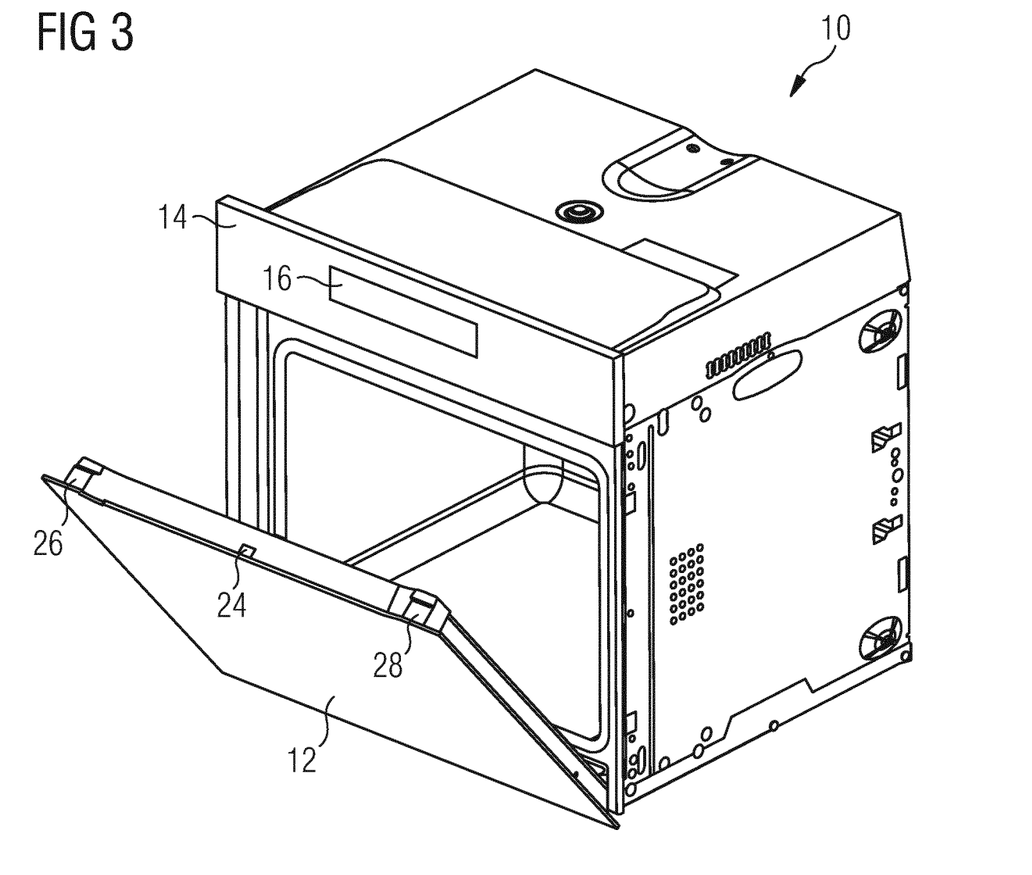
FIG. 3 illustrates a schematic perspective view of the domestic appliance with the monitoring system according to a second embodiment of the present invention.

FIG. 3 illustrates a schematic perspective view of the domestic appliance 10 with the monitoring system according to a second embodiment of the present invention.

The domestic appliance 10 comprises the door 12 and the front panel 14, wherein the user interface 16 is integrated within said front panel 14. However, the door 12 of the second embodiment does not include any door handle 18. The door 12 of the second embodiment is also a drop down door.

In this example, the monitoring system comprises a central door sensor 24 and two lateral door sensors 26 and 28. In general, the monitoring system may comprise the central door sensor 24 and/or at least one lateral door sensor 26 and/or 28. The central door sensor 24 and the lateral door sensors 26 and 28 are arranged within the inner upper portion of the door 12. The central door sensor 24 is arranged within a central inner upper portion of the door 12, while the lateral door sensors 26 and 28 are arranged in the inner upper corners of the door 12. The term "inner upper" relates to the closed state of the door 12.

The door sensors 22, 24, 26, 28, 30 and 32 may be arranged in different positions of the door 12. The door sensors 22, 24, 26, 28, 30 and 32 mentioned above are arranged in preferred positions. In particular, only one single door sensor 22, 24, 26, 28, 30 or 32 including the accelerometer and the gyroscope is a preferred solution.

Figure 4:
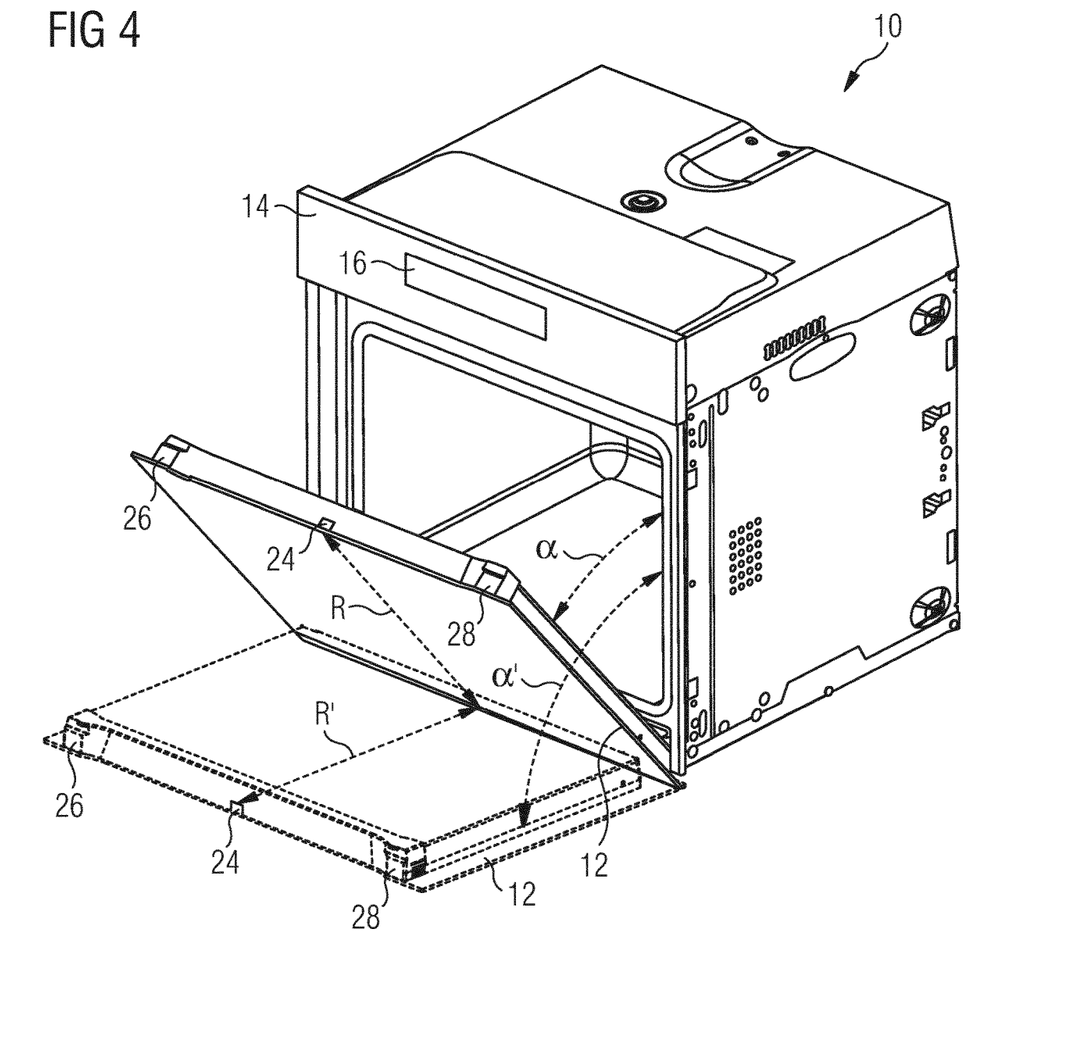
FIG. 4 illustrates a schematic perspective view of the domestic appliance with the monitoring system according to the second embodiment of the present invention.

FIG. 4 illustrates a schematic perspective view of the domestic appliance 10 with the monitoring system according to the second embodiment of the present invention.

In FIG. 4 the partially opened state of the door 12 and a completely opened state of said door 12 are shown, wherein the door 12 in the completely opened state is represented by dashed lines. In the partially opened state, the door 12 is opened to the angle α. In the completely opened state, the door 12 is opened to the angle α'. In the partially opened state of the door 12, the position vector R defines the position of the central door sensor 24. In contrast, the position vector R' defines the position of the central door sensor 24 in the completely opened state of the door 12.

Figure 5:
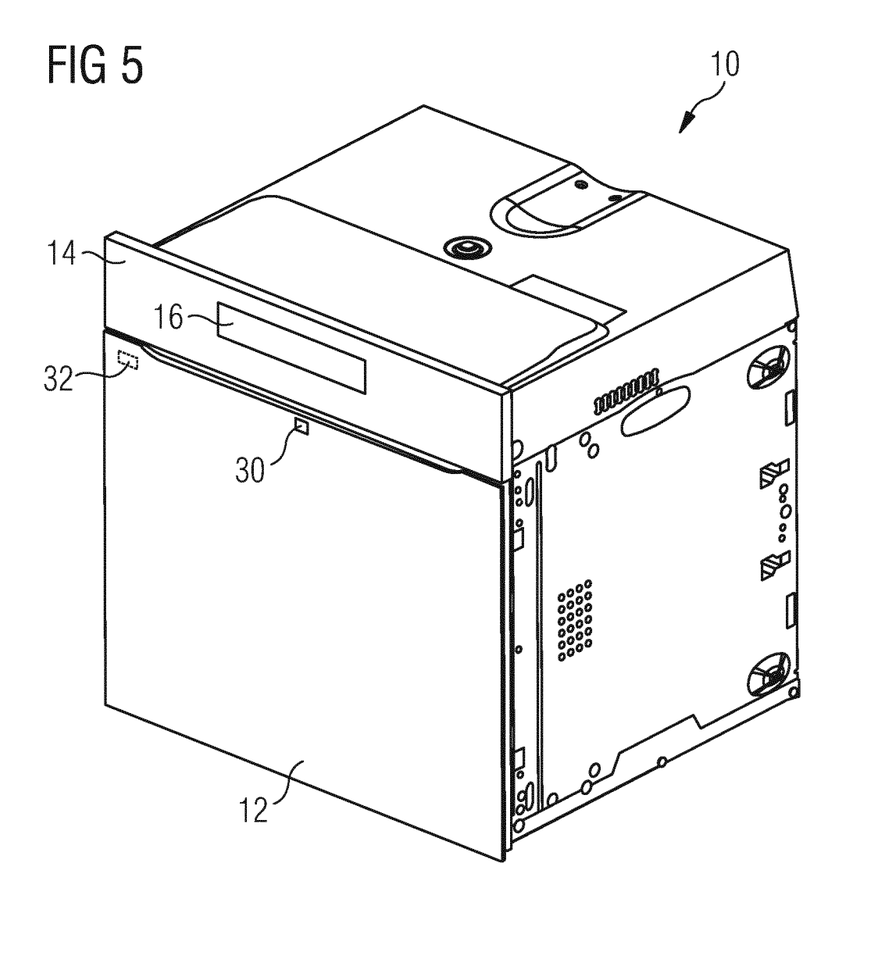
FIG. 5 illustrates a schematic perspective view of the domestic appliance with the monitoring system according to a third embodiment of the present invention.

FIG. 5 illustrates a schematic perspective view of the domestic appliance 10 with the monitoring system according to a third embodiment of the present invention.

The domestic appliance 10 comprises the door 12 and the front panel 14, wherein the user interface 16 is integrated within said front panel 14. The door 12 of the third embodiment does not include any door handle 18. The door 12 of the third embodiment is a swing door with hinges on the right hand side as shown or a drop down door.

The monitoring system comprises an inner door sensor 30 and optionally an outer door sensor 32. The inner door sensor 30 and/or the outer door sensor 32 are arranged within the upper portion of the door 12. The inner door sensor 30 is arranged in a central position of the upper portion of the door 12. In the case of the swing door the outer door sensor 32 is arranged opposite to the hinge of the door 12.

Figure 6:
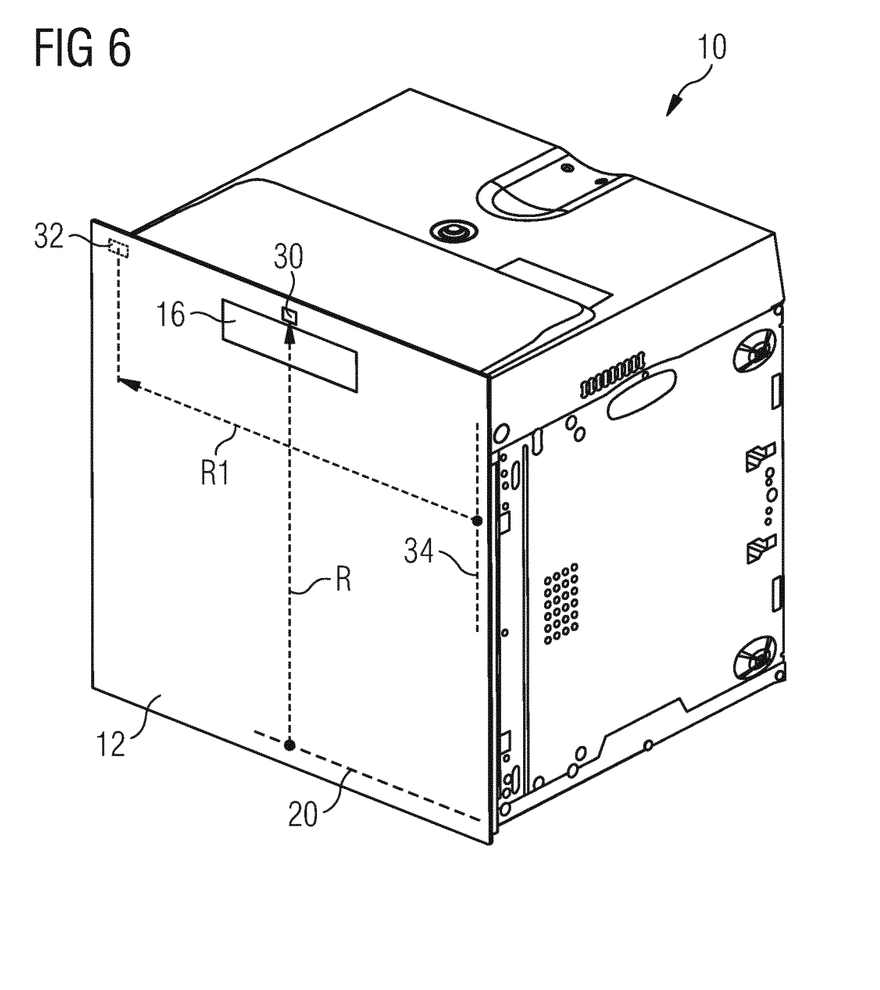
FIG. 6 illustrates a schematic perspective view of the domestic appliance with the monitoring system according to a fourth embodiment of the present invention.

FIG. 6 illustrates a schematic perspective view of the domestic appliance 10 with the monitoring system according to a fourth embodiment of the present invention. FIG. 6 shows both versions of the door 12, i.e. the swing door and the drop down door, in one picture. The hinge axes 20 and 34 and positions of the sensors 30 and 32 related to said hinge axes 20 and 34 are shown.

The user interface 16 is integrated within door 12. The horizontal hinge axis 20 extends in the lower portion of the door 12 in the drop down door version, while a vertical hinge axis 34 extends on the right hand side of the door 12 in the swing door version. In the drop down door version the inner door sensor 30 is arranged in the upper central portion of the door 12 and at the distance R from the horizontal hinge axis 20. In the swing door version the outer door sensor 32 is arranged on the left hand side in the upper portion of the door 12 and at a distance R1 from the vertical hinge axis 34.

The distance R between the inner door sensor 30 and the horizontal hinge axis 20 is as big as possible. The big distance R between the outer door sensor 30 and the horizontal hinge axis 20 allows a high measurement precision of the monitoring system.

Further, in the swing door version the distance R1 between the outer door sensor 32 and the vertical hinge axis 34 is also as big as possible. The big distance R1 between the outer door sensor 32 and the vertical hinge axis 34 allows the high measurement precision of the monitoring system.

The door sensors 30 and 32 are distant from the corresponding hinge axes 20 and 34, respectively, resulting in an increased measurement precision.

Figure 7:
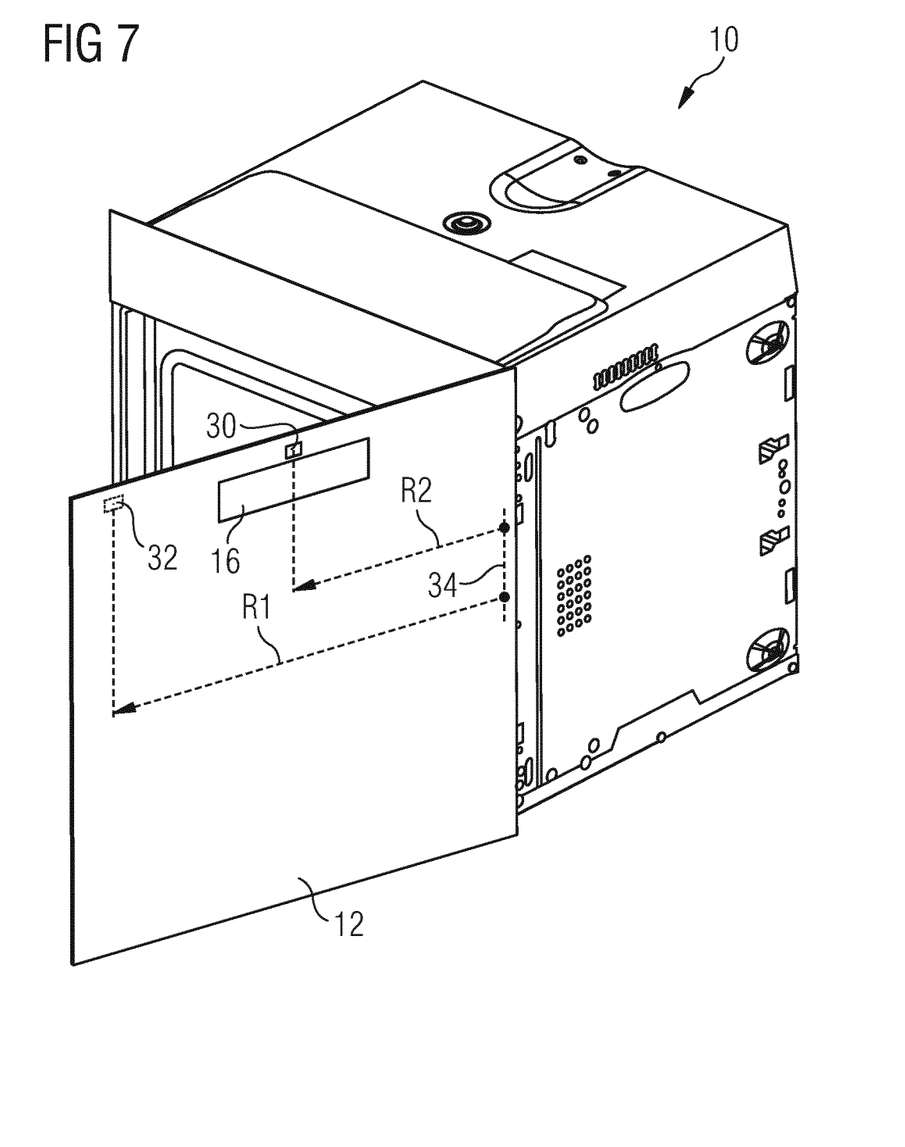
FIG. 7 illustrates a schematic perspective view of the domestic appliance with the monitoring system according to the fourth embodiment of the present invention.

FIG. 7 illustrates a schematic perspective view of the domestic appliance 10 with the monitoring system according to the fourth embodiment of the present invention.

In FIG. 7 the door 12 is opened as a swing door around the vertical hinge axis 34. The outer door sensor 32 is arranged at the distance R1 from the vertical hinge axis 34. The inner door sensor 30 is arranged at a smaller distance R2 from the vertical hinge axis 34, but preferably close to the user interface 16. For example, the inner door sensor 30 is a part of the user interface 16, which allows an easy assembling.

The present invention allows the monitoring of the states of the door 12 by low complexity. The door sensors 22, 24, 26, 28, 30 and 32 are arranged far away from the corresponding hinge axes 20 and 34, respectively, resulting in an increased accuracy of measurements. Further, the door sensors 22, 24, 26, 28, 30 and 32 are arranged in low temperature areas, so that measurement errors due to too high temperatures are avoided. The door sensors 22, 24, 26, 28, 30 and 32 are very small and arrangeable within the door handle 18 or the door 12.

Figure 8:
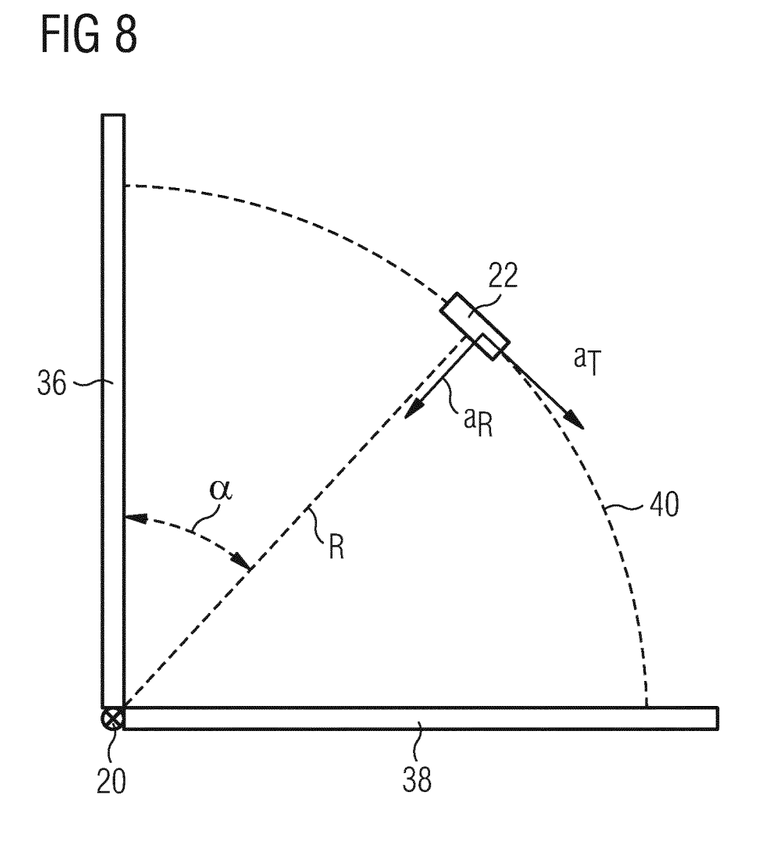
FIG. 8 illustrates a schematic diagram of a path of a door sensor between a closed state and an opened state of a door of the domestic appliance according to the present invention.

FIG. 8 illustrates a schematic diagram of a path 40 of the door sensor 22 between a closed state 36 and an opened state 38 of the door 12 of the domestic appliance 10 according to the present invention.

In this example, the door 12 is a drop down door with the horizontal hinge axis 20, wherein the opening angle of said door 12 is 90 degrees. The door sensor 22 is an inertial measurement unit (IMU). The path 40 of the door sensor 22 is a circular path. The radius R of said circular path corresponds with the distance R between door sensor 22 and horizontal hinge axis 20.

The radial acceleration $a_R$ and the tangential acceleration $a_T$ of the door sensor 22 are given by $$|a_R| = \omega^2 R,$$

$$a_T = R \, d\omega/dt,$$

wherein $\omega$ is the rotational speed of the door 12 and the door sensor 22. The radial acceleration $a_R$ as well as the tangential acceleration $a_T$ are both directly proportional to the radius R.

The opening angle $\alpha$ of the door 12 is calculated by $$\alpha = \int \omega \, dt,$$

wherein the rotational speed $\omega$ is given by $$\omega = |\omega_R| = \sqrt{(|a_R|/R)}.$$

or by $$\omega = \omega_T = \int (a_T/R) dt.$$

Both ways of determining the opening angle $\alpha$ of the door 12 depend on the radius R.

Since an accelerometer is still very sensitive to vibration and mechanical noise in general, the most internal motion unit (IMU) systems use a gyroscope in order to smooth out any accelerometer error. The gyroscope detects the rotational movement in degrees per second around a specified axis. The gyroscope responds very fast, so that a quick response to a change of the opening angle $\alpha$ of the door 12 is obtained.

However, the gyroscope is not free from noise as well. The gyroscope detects rotations but is less sensitive to linear mechanical movements. Furthermore, the gyroscope can drift, so that it does not come back to the zero-rate value when the rotation stops. Thus, the inertial motion unit (IMU) merges these two sensors for giving a quick response, which is sufficiently accurate. This combination solves the problems of the accelerometer and the gyroscope mentioned above.

The inertial motion unit (IMU) directly provides the opening angle $\alpha$ and the rotational speed $\omega$ in degrees per second of the door 12, if said inertial motion unit (IMU) is equipped with a micro controller. If said inertial motion unit (IMU) is not equipped with the micro controller, then output signal values are provided for a control unit. On the basis of input data the control unit compares duty cycle data with firmware set up data and sends an output signal to a motor in order to adjust the opening speed of the door 12. The opening speed of the door 12 may be speeded up, kept constant or slowed down.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 domestic appliance
12 door
14 front panel 16 user interface
18 door handle
20 horizontal hinge axis
22 door sensor
24 central door sensor
26 first lateral door sensor
28 second lateral door sensor
30 inner door sensor
32 outer door sensor
34 vertical hinge axis
36 door in the closed state
38 door in the opened state
40 path of the door sensor
R distance between door sensor and horizontal hinge axis
R' distance between door sensor and horizontal hinge axis
R1 distance between outer door sensor and vertical hinge axis
R2 distance between inner door sensor and vertical hinge axis
α opening angle of the door in partially opened state
α' opening angle of the door in completely opened state
ω rotational speed
$a_R$ radial acceleration
$a_T$ tangential acceleration

The invention claimed is:

1. A monitoring system for a door of a domestic appliance, comprising:
    a control unit and
    at least one door sensor arrangeable or arranged at or within the door,
    the door sensor being an inertial measurement unit including at least one accelerometer and at least one gyroscope,
    the at least one accelerometer being configured to detect a linear acceleration of the door sensor,
    the at least one gyroscope being configured to detect an angular rotational speed of the door sensor,
    wherein the control unit is thereby configured to determine an angular speed of the door based on the detected linear acceleration and the detected angular rotational speed of the door sensor,
    wherein the control unit is configured to vary or keep constant the angular speed of the door during automatic opening and/or closing said door based on the determined angular speed of the door.

2. The monitoring system according to claim 1, wherein the door sensor is arrangeable or arranged close to or at a maximum distance from a hinge axis of the door.

3. The monitoring system according to claim 1, wherein the door sensor is arrangeable or arranged within an upper portion of the door.

4. The monitoring system according to claim 1, wherein the door sensor is arrangeable or arranged within an inner portion of the door.

5. The monitoring system according to claim 1, wherein the door sensor is arrangeable or arranged within a door handle of the door.

6. The monitoring system according to claim 1, wherein the door sensor is arrangeable or arranged within a front panel of the door.

7. The monitoring system according to claim 1, wherein the at least one accelerometer includes one or more microelectromechanical systems.

8. The monitoring system according to claim 1, wherein the at least one accelerometer is a tri-axial accelerometer configured to measure acceleration along three axes that are orthogonal to each other.

9. The monitoring system according to claim 1, wherein the at least one gyroscope includes one or more microelectromechanical systems.

10. The monitoring system according to claim 1, wherein the at least one gyroscope is a tri-axial gyroscope configured to measure angular rotation about three axes that are orthogonal to each other.

11. The monitoring system according to claim 1, wherein the control unit is configured to indicate the angle, the angular speed and the angular acceleration of the door.

12. The monitoring system according to claim 1, wherein said door is automatically openable and/or closable by at least one motor.

13. The monitoring system according to claim 1, wherein the monitoring system is provided for a drop down door and/or for a swing door.

14. A domestic appliance comprising at least one door, and the monitoring system according to claim 1.

15. A domestic appliance comprising a cavity and door adapted to reversibly close access to the cavity, the door being pivotable relative to a hinge axis disposed adjacent to a first end of the door between a closed position and a fully open position thereof, the door comprising a door position sensor disposed adjacent to a second end of the door opposite said first end, the door position sensor comprising an inertial motion unit comprising a tri-axial accelerometer comprising a first microelectromechanical system (MEMS) unit and a tri-axial gyroscope comprising a second microelectromechanical system (MEMS) unit, the inertial motion unit being configured to merge detection signals from both the accelerometer and the gyroscope to detect an opening angle and speed of the door in order to control operation of a motor that actuates the door.

16. The domestic appliance according to claim 15, said door having only a single door position sensor, said appliance excluding a mechanical plunger-style door switch configured to indicate a closed state of the door.

17. The domestic appliance according to claim 15, said door sensor being disposed in a handle of the door.

* * * * *